United States Patent [19]

Bloedorn

[11] 3,810,036

[45] May 7, 1974

[54] PHASE LOCK LOOP FOR LOCKING ON HIGHEST AMPLITUDE SIGNAL

[75] Inventor: Arthur R. Bloedorn, Los Altos, Calif.

[73] Assignee: Hewlett-Packard Company, Palo Alto, Calif.

[22] Filed: Oct. 5, 1972

[21] Appl. No.: 295,387

[52] U.S. Cl. .......................... 331/15, 331/17, 331/26, 331/32

[51] Int. Cl. .......................... H03b 3/04

[58] Field of Search .......................... 331/18, 17, 25, 26, 22, 331/15, 32

[56] References Cited

UNITED STATES PATENTS 3,218,572 11/1965 Dimmick .......................... 331/18 X

FOREIGN PATENTS OR APPLICATIONS 1,125,916 9/1968 Great Britain .......................... 331/25

*Primary Examiner*—Herman Karl Saalbach
*Assistant Examiner*—Siegfried H. Grimm
*Attorney, Agent, or Firm*—Patrick J. Barrett

[57] ABSTRACT

A broadband, limiting amplifier is used in the IF portion of a harmonic phase lock loop, preceding the IF bandpass filter. The limiting amplifier gives an output signal of a predetermined magnitude having a frequency corresponding to the input signal having the highest level, and a detector connected to the output of the IF bandpass filter inhibits the phase lock loop whenever the signal passing through the bandpass filter is below the predetermined magnitude.

5 Claims, 3 Drawing Figures

PHASE LOCK LOOP FOR LOCKING ON HIGHEST AMPLITUDE SIGNAL

BACKGROUND AND SUMMARY OF THE INVENTION

Harmonic phase lock loops are frequently used in high frequency measuring instruments, such as frequency counters to extend the frequency range of the instrument. In a harmonic phase lock loop, a test signal is down converted to an intermediate frequency which is compared with a reference oscillator to provide a feedback signal to the down converter. The relatively high frequency test signal is locked to a harmonic of a low frequency signal plus an offset determined by a low frequency reference which determines the intermediate frequency. A harmonic mixer is used in the down converter to mix it with harmonics of the low frequency local oscillator signal. The output of the harmonic mixer, after amplification, is filtered by a bandpass filter centered about the intermediate frequency and signals passing through the bandpass filter are compared with the reference oscillator output in a phase detector. Any phase error between the two signals produces an output from the phase detector which is amplified and applied to the local oscillator to adjust its frequency such that the output of the harmonic mixer will be a signal of the same frequency as the reference oscillator. In theory, phase lock should occur only when the signal or harmonic of the signal from the local oscillator equals the test signal plus or minus the intermediate frequency. However, because a harmonic mixer produces the sum and difference frequencies of the harmonics of both input signals, false locks can occur when the sum or difference between a harmonic of the test signal and the local oscillator signal is equal to the intermediate frequency. False locks can also occur if a spurious signal is present along with the desired test signal. These false locks are highly undesirable since they produce undetectably false readings on the measuring instrument.

The present invention prevents false locks by detecting the highest level input signal and causing the harmonic phase lock loop to lock only on that signal. Because the harmonics of a test signal are lower in amplitude than the test signal, the harmonic phase lock loop will always lock on the strongest signal and the loop will not lock either on a harmonic of that signal or on a lower level spurious signal. The output of the harmonic mixer, before going through a bandpass filter, is fed through a broadband limiting amplifier, thus producing a square wave at its output which has a frequency equal to the fundamental frequency of the highest level signal from the harmonic mixer. For this to occur, the bandwidth of the amplifier needs to be at least one-half of the highest frequency of the local oscillator. The output of the limiting amplifier passes through the bandpass filter to the phase detector and to a threshold detector. The threshold detector is triggered only by signals having the amplitude of the fundamental frequency of the square wave coming out of the limiting amplifier. The threshold detector output is connected to a switch in the feedback path between the phase detector and the local oscillator to inhibit the phase lock loop when the signal passing through the bandpass filter is less than a predetermined percentage of the maximum output of the limiting amplifier. The threshold detector thus insures that phase lock can only occur when the frequency difference between the test signal and a harmonic of the local oscillator signal is equal to the intermediate frequency.

DESCRIPTION OF THE PREFERRED EMBODIMENT

Figure 1:
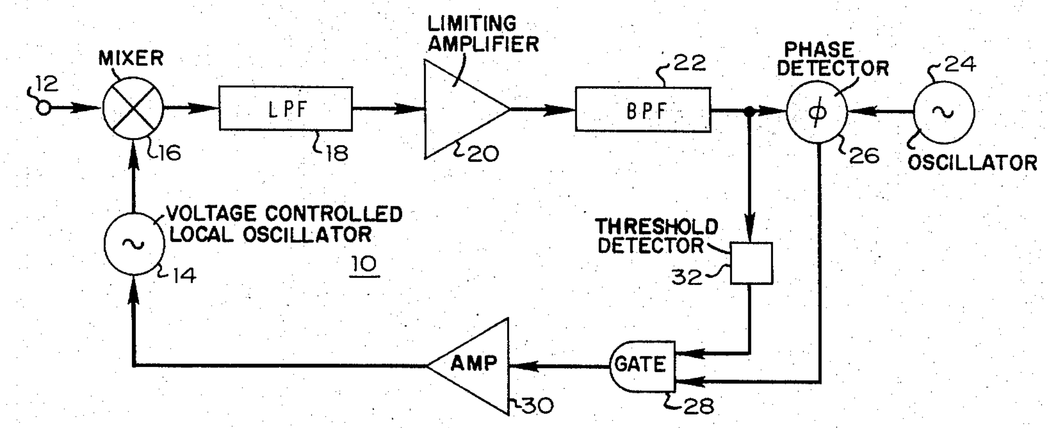
FIG. 1 shows a block diagram of the preferred embodiment of the present invention.

FIG. 1 shows a harmonic phase lock loop 10 having a test frequency input 12 and a voltage controlled local oscillator 14 connected to a harmonic mixer 16. The output of harmonic mixer 16 is connected to a low pass filter 18. The cutoff frequency of the low pass filter 18 (*fc*) is one-half of the maximum frequency of local oscillator 14 (*flo*/2), since, as is well known from the sampling theorem, one-half of the maximum frequency of the local oscillator is the greatest frequency that will result from the difference between a test signal and the closest harmonic of the local oscillator. This filter thus excludes main responses resulting from the mixing of the test signal with more than one harmonic of the local oscillator. It is desirable to have *fc* no less than *flo*/2 so that the output of the harmonic mixer is not distorted below *flo*/2.

Low pass filter 18 is connected to limiting amplifier 20 which amplifies and limits the signal from low pass filter 18 to produce a square wave output of a predetermined amplitude. Because the highest level signal at the input of limiting amplifier 20 is amplified to the highest level, the output square wave fundamental frequency is equal to the frequency of the highest amplitude input signal. The lower frequency signals then appear as frequency modulation (fm) on the square wave. The output of limiting amplifier 20 is connected to a bandpass filter 22 which is centered about the frequency of a reference oscillator 24. Both filter 22 and oscillator 24 are connected to a phase detector 26 which produces an error signal indicative of the phase difference between the signal from the filter and oscillator 24. The output of phase detector 26 is connected to the control input of local oscillator 14 through a gate 28 and an amplifier 30.

A threshold detector 32 is also connected to the output of filter 22. From the Fourier series representation of a square wave, it is well known that a square wave is made up of a fundamental sinusoidal signal and its odd harmonics which decrease in amplitude with increasing harmonic number. Thus, the third harmonic is only one-third the amplitude of the fundamental signal. Threshold detector 32 will detect only the fundamental signal from the output of limiting amplifier 20 if the threshold is set greater than approximately one-third of the predetermined amplitude of the limiting amplifier output signal. When the signal at the input of the threshold detector exceeds the threshold, a signal is supplied by the threshold detector to gate 28 to connect the output of phase detector 26 to amplifier 30 and thus complete the feedback loop. Whenever the output of limiting amplifier 20 does not exceed the threshold the phase lock loop is inhibited because gate 28 is left open, and no false locks can therefore occur. When the feedback loop is completed by gate 28 and the loop is locked, the square wave signal from amplifier 20 will be converted to a d.c. signal in phase detector 26. The fm on the square wave signal will appear as a superimposed a.c. signal which will be rejected by the closed loop bandwidth.

Figure 2:
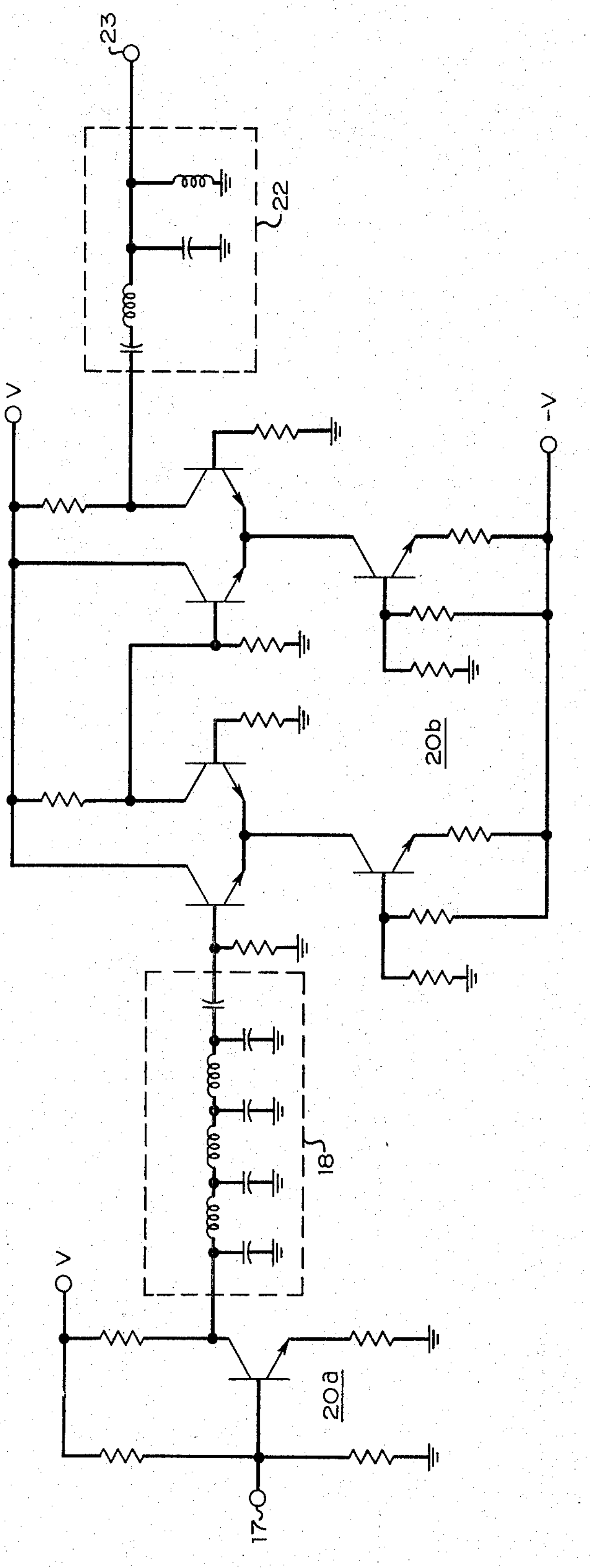

Exemplary embodiments of low pass filter 18, amplifier 20 and bandpass filter 22 are shown in FIG. 2. A terminal 17 connects the input of a pre-amplifier section 20*a* to the output of harmonic mixer 16. The output of pre-amplifier section 20*a* is in turn connected to low pass filter 18 which comprises series inductive and shunt capacitive elements. The amplifying and limiting portion 20*b* comprises two cascaded, high-gain differential amplifiers. These amplifiers limit hard to give essentially a square wave output regardless of the wave form of the input signal, so long as the magnitude of the input signal is not less than the output voltage swing of the amplifier divided by the overall gain of the amplifier. The output of the limiting amplifier is connected to a capacitive-inductive bandpass filter 22 having an output terminal 23.

Figure 3:
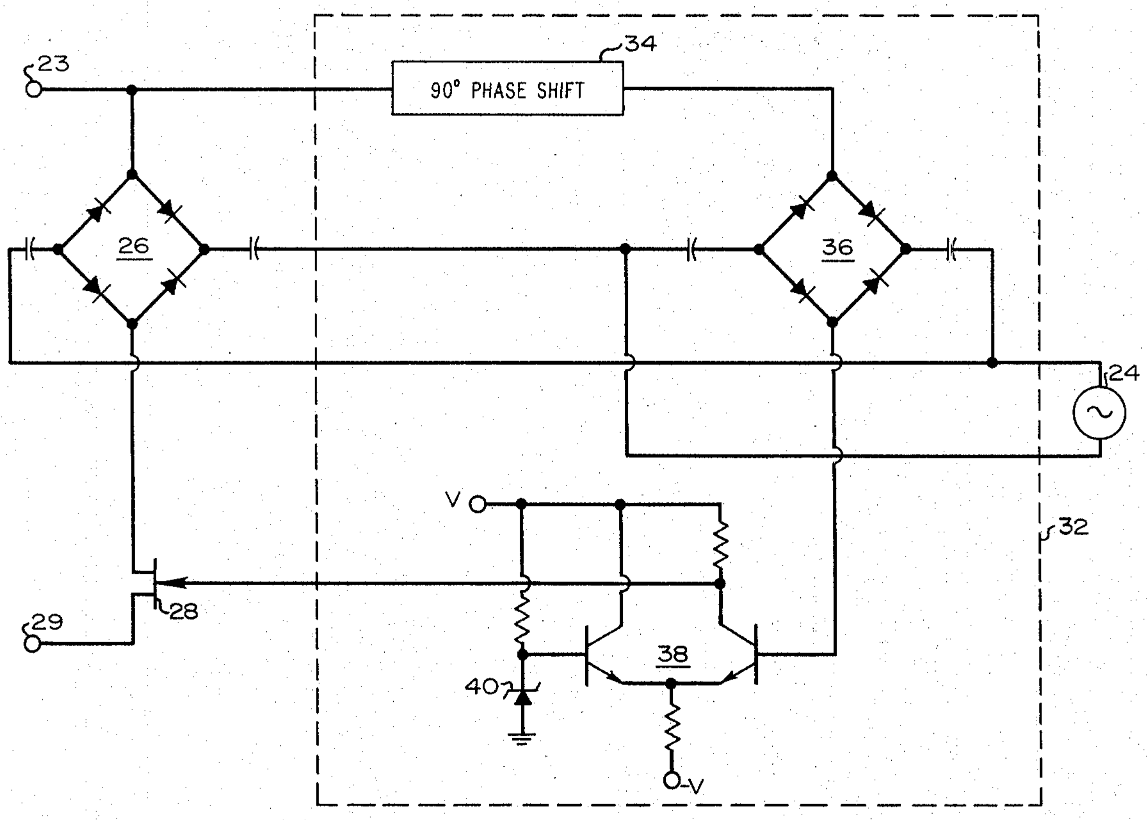
FIGS. 2 and 3 show schematic diagrams of portions of FIG. 1.

FIG. 3 shows exemplary embodiments of phase detector 26, gate 28 and threshold detector 32. Phase detector 26, connected to output terminal 23 of the bandpass filter, comprises a common four diode bridge. In high frequency counting systems using harmonic converters, quadrature detectors are commonly used as part of a harmonic number determining scheme. Such a quadrature detector may be used as part of the threshold detecting scheme. A quadrature detector may comprise a 90° phase shifter 34 connected to filter output terminal 23 and to another phase detector 36. The output phase detector 36 is connected to a differential amplifier 38 and compared with a reference voltage provided by a zener diode 40. The output of differential amplifier 38 is connected to the gate of a field effect transistor 28 which serves to gate the output signal from phase detector 26. The source electrode of the field effect transistor is connected to input terminal 29 of the phase lock loop amplifier 30.

I claim:

1. A harmonic phase lock loop comprising:

frequency converting means having a first and second input and an output for converting the frequency of an input signal to a different frequency;

a limiting amplifier having an input connected to the output of the frequency converting means and an output for producing an output signal of a predetermined amplitude having a fundamental frequency equal to the frequency of the highest amplitude signal from the output of the frequency converting means;

a bandpass filter having an input connected to the output of the limiting amplifier and having an output;

a reference frequency source having an output;

feedback means having a first input connected to the bandpass filter, a second input connected to the reference frequency source and an output connected to the frequency converting means for supplying a feedback signal to the frequency converting means indicative of the difference between the frequency of an output signal from the bandpass filter and the reference frequency; and control means having an input connected to the output of the bandpass filter and an output connected to a third input of the feedback means for inhibiting the feedback signal whenever the output signal from the bandpass filter is below a predetermined amplitude.

2. A harmonic phase lock loop as in claim 1 wherein:

the frequency converting means includes a harmonic mixer having a first input connected to receive the input signal and a variable frequency oscillator having an output connected to a second input of the harmonic mixer; and the feedback means includes a phase detector having a first input connected to the output of the reference frequency source and a second input connected to the output of the bandpass filter, and a feedback amplifier having an input connected to receive the output of the phase detector, the feedback amplifier having an output connected to the variable frequency oscillator.

3. A harmonic phase lock loop as in claim 2 wherein the control means comprises switching means having a control input and connected between the output of the phase detector and the input of the feedback amplifier for interrupting the signal path therebetween in response to a control signal on the control input, and threshold detecting means connected to the output of the bandpass filter and the control input of the switching means for supplying the control signal when the amplitude of the output signal from the bandpass filter falls below a predetermined level.

4. A harmonic phase lock loop as in claim 3 including a low pass filter connected between the output of the harmonic mixer and the input of the limiting amplifier and wherein the threshold detecting means comprises a phase shifting circuit having an input connected to the output of the bandpass filter, a second phase detector having a first input connected to an output of the phase shifting circuit and a second input connected to the output of the reference oscillator, and a threshold detector having an input connected to an output of the second phase detector and an output connected to the control input of the switching means.

5. A harmonic phase lock loop as in claim 2 wherein the limiting amplifier has a bandwidth of one-half of the highest frequency of the variable frequency oscillator.

* * * * *